United States Patent
Sirat et al.

[11] Patent Number: 6,134,013
[45] Date of Patent: Oct. 17, 2000

[54] OPTICAL BALL GRID ARRAY INSPECTION SYSTEM

[75] Inventors: Gabriel Y. Sirat, Jerusalem, Israel; Yann Malet, Saint-Cyr l'Ecole, France

[73] Assignee: Optimet, Optical Metrology Ltd., Jerusalem, Israel

[21] Appl. No.: 09/149,399

[22] Filed: Sep. 8, 1998

Related U.S. Application Data

[60] Provisional application No. 60/058,929, Sep. 15, 1997, and provisional application No. 60/064,882, Nov. 6, 1997.

[51] Int. Cl.$^7$ .................................................. G01B 11/24
[52] U.S. Cl. ......................... 356/376; 356/372; 356/364; 356/369
[58] Field of Search .................................. 356/376, 375, 356/369, 364, 368, 372

[56] References Cited

U.S. PATENT DOCUMENTS

| | | | |
|---|---|---|---|
| 4,928,313 | 5/1990 | Leonard et al. ............................. | 382/8 |
| 5,024,529 | 6/1991 | Svetkoff et al. ............................ | 356/376 |
| 5,465,152 | 11/1995 | Bilodeau et al. .......................... | 356/371 |
| 5,793,051 | 8/1998 | Stern et al. ................................ | 356/376 |
| 5,859,924 | 1/1999 | Liu et al. .................................... | 356/375 |
| 6,028,671 | 2/2000 | Svetkoff et al. ............................ | 356/368 |

OTHER PUBLICATIONS

Beck et al., "3–D Solder Paste Inspection for High–Yield Ball Grid Array (BGA) Assembly".

*Primary Examiner*—Frank G. Font
*Assistant Examiner*—Roy M. Punnoose
*Attorney, Agent, or Firm*—Bromberg & Sunstein LLP

[57] ABSTRACT

A method and apparatus for inspecting a three dimensional structure, such as an electronic component, using collimated light for accurately measuring the three-dimensional structure of members protruding above the surface of the component. Collimated light illuminates the surface, and spherical or other three-dimensional structure on the surface is analyzed, using stereoscopic, holographic, Moire, or conoscopic analysis of light reflected or scattered by the structure, using an array of optical detectors in a detector plane.

11 Claims, 1 Drawing Sheet

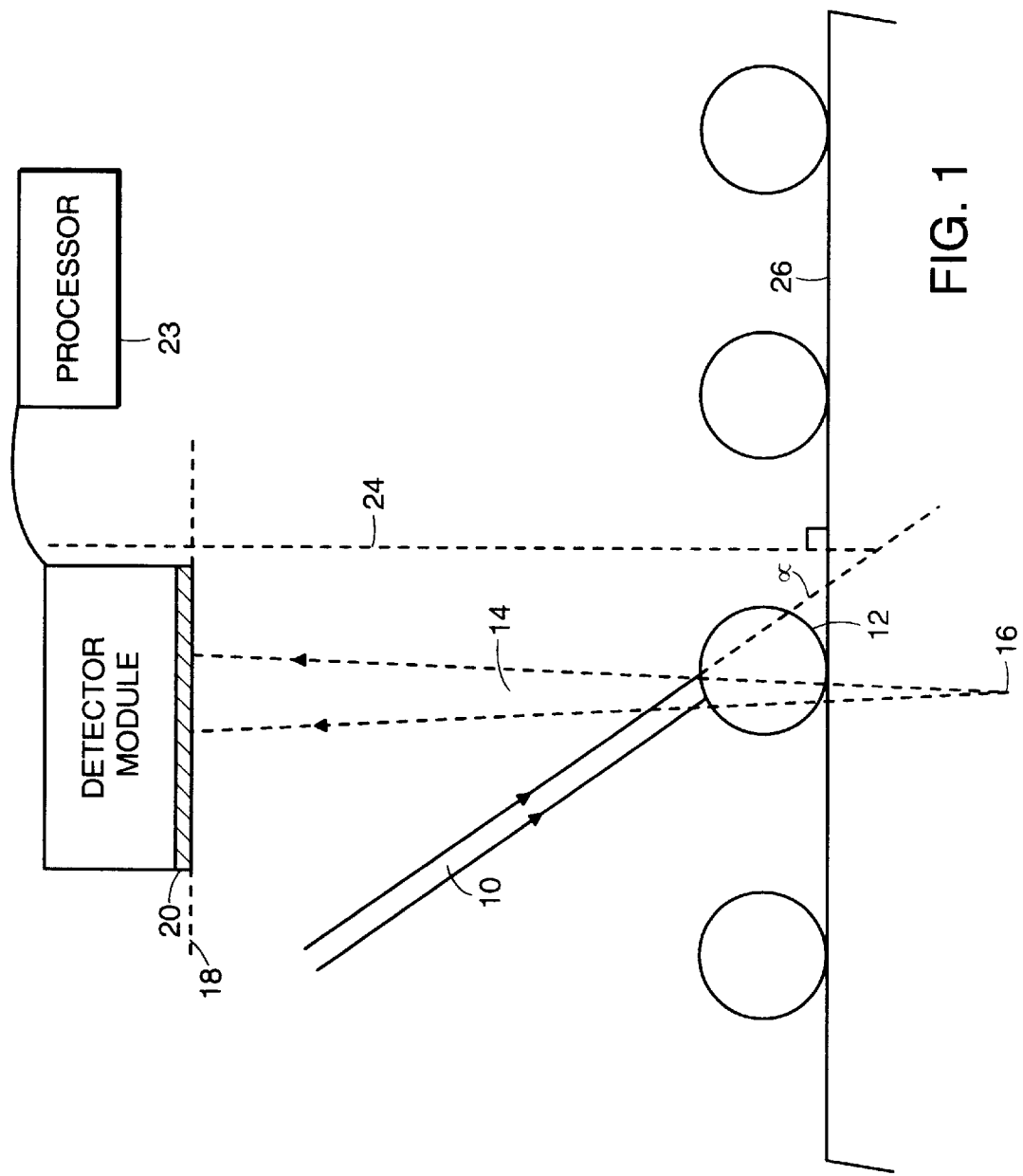

OPTICAL BALL GRID ARRAY INSPECTION SYSTEM

The present application claims priority from U.S. Provisional Application 60/058,929 filed Sep. 15, 1997, and from U.S. Provisional Application 60/064,882, filed Nov. 6, 1997, which applications are herein incorporated by reference.

TECHNICAL FIELD

The present invention pertains to an optical apparatus and method for inspecting electronic components, and, more particularly, to the use of collimated light and stereoscopic, holographic, Moire or conoscopic analysis of reflected or scattered light to accurately measure the three dimensional structure of protruding members of such components.

BACKGROUND OF THE INVENTION

Various electronic packaging methods, implemented to provide high I/O as well as increased packing density, have imposed new requirements on the performance characteristics of inspection systems. These methods include the controlled collapse connections of Flip Chip Attach as well as Ball Grid Array (BGA) and Solder Column Connect technologies, the former employing high density solder ball connections and the latter employing a similar array but of columnar leads. "BGA", as used in this application, refers to a genus of packaging strategies employing varying sizes and shapes of leads which need not be restricted to actual spheres of solder but may include columns or mounds as well. Characteristic of the various technologies is the significance, to acceptability for assembly, of the three-dimensional shape of the lead structure.

For reliability of the BGA solder connections, is important that there be neither too much nor inadequate solder, and that the balls be present, unshorted, and properly registered, both laterally with respect to the pad array structure and vertically so as to ensure coplanarity of the points of tangency to the entire array of balls. Furthermore, it is important that inspection of the bonding structures be performed rapidly and accurately.

Methods of lead inspection which are known in the art include x-ray inspection, triangulation to determine the point of optical reflection of a point source of light synchronously scanned across the array, and focussing, by means of multiple exposures, of an array camera on the BGA to determine a focal position for each ball. Existing techniques requiring multiple image acquisitions lack the efficiency of a method whereby three dimensional information regarding the entire array is determined in a single exposure.

Other applications, such as those in which parts employing small ball bearings are inspected, for example, similarly require accurate determination of the three-dimensional structure of a plurality of small components within a single "view" of the part.

SUMMARY OF THE INVENTION

In accordance with one aspect of the invention, in a preferred embodiment, there is provided a method for inspecting a part having a plurality of protruding members. The method has the steps of:
  a. illuminating a portion up to the entirety thereof of the part with substantially collimated light;
  b. detecting the light reflected form the part by means of a singular exposure of a sensor system;
  c. creating an image of light detected by the sensor system; and
  d. analyzing the image created from light detected by the sensor system to determine the three dimensional structure of the plurality of protruding members.

In accordance with an alternate embodiment of the present invention, the step of analyzing the three dimensional structure of the protruding members may include determining loci of virtual focus positions for each protruding member. The step of sensing the light reflected from the part may be by means of a detector array. Additionally, the step of creating an image of light may include recording a Moire interferogram or conoscopic hologram of the portion of the part, and may also include the further steps of polarizing the light reflected from the part, passing the light through an anisotropic optical element, passing the light through a polarization analyzer, and creating a conoscopic hologram in a plane of a detector array.

In accordance with further alternate embodiments of the invention, the step of illuminating a portion of the part may include the step of polarizing the illuminating light. The step of creating an image of light may also include creating a holographic image.

In accordance with another aspect of the present invention, there is provided an apparatus for inspecting a part having a plurality of protruding members. The apparatus has a source of collimated light for illuminating a portion up to the entirety thereof of the part and a sensor system for detecting light reflected by the plurality of protruding members of the part. Additionally, the apparatus has a memory for storing an image of light collected by the sensor system and a controller for analyzing the image created from light detected by the sensor system to determine the three dimensional structure of the plurality of protruding members. In accordance with an alternate embodiment of the invention, the sensor system may include a detector array and the apparatus may also have a conoscope for generating a conoscopic hologram at the detector array.

BRIEF DESCRIPTION OF THE DRAWING

The invention will more readily be understood by reference to the following description taken with the accompanying FIG. 1, which depicts the optical layout of an optical ball grid array inspection system in accordance with a preferred embodiment of the invention.

DETAILED DESCRIPTION OF PREFERRED EMBODIMENTS

The present invention provides novel methods for optically inspecting parts which contain large numbers of small, three-dimensional protruding members.

Conoscopy is an interferometric technique capable of accurately determining the distance to a point within an object volume without employing a reference beam. Alternatively, the angle with respect to an optical axis of light emanating from a point on an object may also be determined accurately by conoscopic means. Conoscopy is the subject of various patents, including U.S. Pat. Nos. 4,602,844, 4,976,504, 5,081,540, and 5,081,541, which are all incorporated herein by reference. Additionally, conoscopic holography is also described in copending U.S. Provisional Patent Application, Ser. No. 60/028,245, filed Oct. 9, 1996, and also incorporated herein by reference.

If an object is illuminated in a parallel or collimated beam of light, then the angle of reflection of light relative to a known axis allows accurate determination of the position of the reflecting surface using standard techniques known to persons of ordinary skill in the optical arts. Collimated light, as known to persons skilled in the art of optics, includes light with a wavefront of essentially infinite radius of curvature, as may be obtained at the focal plane of a beam. Referring now to FIG. 1, if a parallel beam 10 of light is projected onto a sphere 12, reflected light 14 appears to be emanating from a virtual focus 16. If light is collected over a sufficiently large area of a detector plane 18, by a detector array 20 such as an array of charge-coupled devices, then both the lateral and longitudinal position of the virtual focus 16 of the sphere may be determined with required precision. The determination of the angle at which light is reflected by a point on the inspected part may be performed by detector module 22 and associated processor 23 using any stereographic technique, including, for example and without limitation, holography, Moire interferometry, and conoscopy. Additionally, any of these techniques may be applied, concurrently, to large numbers of spheres 12 within the field of view so as to establish the degree of coplanarity of the spheres.

If the angle of illumination $\alpha$ (with respect to normal 24 to surface 26) by parallel beam 10 is varied, the loci of the virtual foci of the plurality of spheres may again be determined in the same manner, thereby determining the precise shape of the substantially spherical protrusions.

This technique may be employed for the inspection of ball grid arrays in the context of electronic parts packaging, and, similarly, in other applications in which a large number of minute protuberances must be inspected with a high degree of accuracy.

The determination of the angle at which light is reflected by a point on the inspected part may be performed using any of a variety of stereographic techniques known in the art. Holography, Moire interferometry, and conoscopy are presented as examples of such techniques.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A method for inspecting a part having a plurality of protruding members, the method comprising:
   a. illuminating a portion up to the entirety thereof of the part with substantially collimated light;
   b. detecting light reflected from the part by means of a singular exposure of a sensor system;
   c. creating an image of light detected by the sensor system; and
   d. analyzing the image created from light detected by the sensor system to determine the three dimensional structure of the plurality of protruding members.

2. A method according to claim 1, wherein the step of analyzing the three dimensional structure of the protruding members includes determining loci of virtual focus positions for each protruding member.

3. A method according to claim 1, wherein the sensor system includes a detector array.

4. A method according to claim 1, wherein the step of creating an image of light includes recording a conoscopic hologram of the portion of the part.

5. A method according to claim 1 wherein the step of collecting light reflected from the part includes the steps of:
   a. polarizing the light reflected from the part;
   b. passing the light through an anisotropic optical element;
   c. passing the light through a polarization analyzer; and
   d. creating a conoscopic hologram in a plane of a detector array.

6. A method according to claim 5, wherein the step of illuminating a portion of the part includes the step of polarizing the illuminating light.

7. A method according to claim 5, wherein the step of creating an image of light includes creating a holographic image.

8. An apparatus for inspecting a part having a plurality of protruding members, the apparatus comprising:
   a. a source of collimated light for illuminating a portion up to the entirety thereof of the part;
   b. a sensor system for detecting light reflected by the plurality of protruding members of the part;
   c. a memory for storing an image of light sensed by the sensor system; and
   d. a controller for analyzing the image created from light sensed by the sensor system in a singular exposure to determine the three dimensional structure of the plurality of protruding members.

9. An apparatus according to claim 8, wherein the sensor system includes a detector array.

10. An apparatus according to claim 9, further comprising a conoscope for generating a conoscopic hologram at the detector array.

11. A method according to claim 1, wherein the step of creating an image of light includes creating a Moire interferogram.

* * * * *